(12) United States Patent
Ancora et al.

(10) Patent No.: US 8,598,064 B2
(45) Date of Patent: Dec. 3, 2013

(54) PHOTOCATALYTIC COMPOSITES CONTAINING TITANIUM AND LIMESTONE FREE FROM TITANIUM DIOXIDE

(75) Inventors: Renato Ancora, Bergamo (IT);
Massimo Borsa, Bergamo (IT);
Maurizio Iler Marchi, Melzo (IT)

(73) Assignee: Italcementi S.p.A., Bergamo (IT)

( * ) Notice: Subject to any disclaimer, the term of this patent is extended or adjusted under 35 U.S.C. 154(b) by 287 days.

(21) Appl. No.: 13/056,957

(22) PCT Filed: Jul. 31, 2009

(86) PCT No.: PCT/EP2009/005572
§ 371 (c)(1),
(2), (4) Date: Apr. 28, 2011

(87) PCT Pub. No.: WO2010/012489
PCT Pub. Date: Feb. 4, 2010

(65) Prior Publication Data
US 2011/0192325 A1 Aug. 11, 2011

(30) Foreign Application Priority Data
Aug. 1, 2008 (IT) .............................. MI2008A1447

(51) Int. Cl.
| | | |
|---|---|---|
| B01J 21/18 | (2006.01) |
| B01J 27/20 | (2006.01) |
| C01B 31/24 | (2006.01) |
| C01F 5/24 | (2006.01) |
| C01F 11/18 | (2006.01) |
| C09C 1/02 | (2006.01) |
| C09D 4/00 | (2006.01) |
| C09D 101/00 | (2006.01) |
| C09D 201/00 | (2006.01) |
| C04B 28/26 | (2006.01) |
| C04B 7/00 | (2006.01) |
| C04B 14/00 | (2006.01) |
| C04B 35/00 | (2006.01) |
| C04B 40/00 | (2006.01) |

(52) U.S. Cl.
USPC ... 502/174; 423/419.1; 423/430; 106/284.04; 106/464; 106/637; 106/738; 106/817; 106/819; 501/134; 501/135; 501/136

(58) Field of Classification Search
USPC .......... 502/174; 423/419.1, 430; 106/284.04, 106/464, 637, 738, 817, 819; 501/134–136
See application file for complete search history.

(56) References Cited

U.S. PATENT DOCUMENTS

| | | | |
|---|---|---|---|
| 4,520,004 A | 5/1985 | Uedaira et al. |
| 4,670,243 A | 6/1987 | Wilson et al. |

(Continued)

FOREIGN PATENT DOCUMENTS

WO    WO2008-017934    2/2008

OTHER PUBLICATIONS

Kisel, N. G. et al, "On Calcium Dititanate." *Izv. Akad. Nauk USSR-Neorg. Mater.* 8, No. 1972 (1972): 1782-1785.

(Continued)

*Primary Examiner* — Patricia L Hailey
(74) *Attorney, Agent, or Firm* — Novak Druce Connolly Bove + Quigg LLP (57) ABSTRACT

New photocatalytic product comprising compounds of titanium integrated with limestone. The product is obtained by reacting limestone with a suitable precursor of titanium dioxide in a basic solution, recovering the product in particular conditions, drying it and calcining it. By operating in presence of sodium, a composite is obtained substantially free from titanium dioxide, containing limestone and calcium titanate. The composite thus obtained, used as such or in mixture with other components, has shown an unexpectedly high photocatalytic activity.

15 Claims, 4 Drawing Sheets

(56) References Cited

U.S. PATENT DOCUMENTS

| | | | | |
|---|---|---|---|---|
| 5,082,648 | A | * | 1/1992 | Damiano et al. .............. 423/598 |
| 6,409,821 | B1 | * | 6/2002 | Cassar et al. .................. 106/733 |
| 7,025,824 | B2 | * | 4/2006 | Axen et al. .................... 106/695 |
| 7,686,879 | B2 | * | 3/2010 | Grochal et al. .......... 106/287.19 |
| 8,092,586 | B2 | * | 1/2012 | Ancora et al. ................ 106/416 |

OTHER PUBLICATIONS

Krivovichev, Sergey V. et al., "Cafetite, Ca[T1205](H20): Crystal Structure and Revision of Chemical Formula." *American Mineraliogist* 88, No. 2-3 (2003): 424-429.

Lencka, Malgorzata M., and Richard E. Riman. "Thermodynamics of the Hydrothermal Synthesis of Calcium Titanate with Reference to Other Alkaline-Earth Titanates." *Chemistry of Materials* 7, No. 1 (1995): 18-25. http://pubs.acs.org/doi/pdf/10.1021/cm (accessed 23, 2009).

Limar, T. F. ei al., "On Calcium Tetratitanate." *Zhur. Neorg. Khim.* 17, No. 1972 (1972): 559-561.

Pfaff, G. "Peroxide Route to Synthesize Calcium Titanate Powders of Different Composition." *Journal of the European Ceramic Society* 9, No. 4 (1992): 293-299.

Pfaff, G. "Synthesis of Calcium Titanate Powders by the Sol-Gel Process." *Chemistry of Materials* 6, No. 1 (1994): 58-62. http://pubs.acs.org/doi/pdf/10.1021/em00037a013 (accessed 23, 2009).

\* cited by examiner

PHOTOCATALYTIC COMPOSITES CONTAINING TITANIUM AND LIMESTONE FREE FROM TITANIUM DIOXIDE

CROSS-REFERENCE TO RELATED APPLICATIONS

This application is a §371 national stage entry of International Application No. PCT/EP2009/005572, filed Jul. 31, 2009, which claims priority to Italian Application No. MI2008A001447, filed Aug. 1, 2008, both of which are hereby incorporated herein by reference in their entirety.

FIELD OF THE INVENTION

The present invention concerns the field of photocatalytic materials used for decontamination from environmental pollutants, and for preserving the original colour of articles of manufacture exposed to said pollutants, with application in particular in the field of cement.

STATE OF THE ART

The use of titanium dioxide in the form of anatase as photocatalyst in cement compositions is widely known. The resulting compositions are exploited to make various construction elements and articles of manufacture endowed with photocatalytic properties, capable of decomposing environmental pollutants in presence of light and oxygen. In these compositions titanium dioxide can be dispersed in bulk with the remaining components (WO-A-9805601, to the Applicant); alternatively, firstly a cement base free from titanium dioxide is formed, and then it is externally coated with titanium dioxide, optionally mixed with binders and/or adhesives of various types. In all these cases the titanium-containing photocatalyst is present in the form of a mere physical mixture with the mineral components of the cement composition. The interaction that is established in these cases is of the mechanical or weakly electrostatic kind, and thus there is no adequate continuity between photocatalyst and rest of the mixture. This can lead to various problems linked to inadequate interpenetration of the photocatalytic components and of those constituting the inert material. The close interaction between photocatalyst and mineral elements of the cement is however important for an effective photocatalytic action: indeed, in photocatalytic cements the cement component is known to simultaneously absorb atmospheric pollutants through a process of rapid dynamic equilibrium with the environment (adsorption/desorption): the pollutant temporarily adsorbed is then decomposed by the photocatalyst. However, in known products the adsorbent part and the photocatalytic part are clearly distinct: in this situation a part of the adsorbed pollutant can be desorbed before the photocatalyst is able to act sufficiently, with the consequence of an insufficient level of photocatalysis.

In an attempt to improve the degree of interaction between photocatalytic part and inert part, some materials have been proposed in which the titanium dioxide is supported on mineral components. An example of these products is titanium dioxide supported on metakaolin, described in patent application MI2007A002387, to the Applicant. However, as also highlighted in the aforementioned application in reference to various supports, the reactivity of the titanium dioxide varies greatly depending on the support, and the properties of the resulting product are extremely variable and often unsatisfactory.

A high-performance photocatalytic is particularly desirable in the case of cement materials, characterised by a very low cost/weight ratio: for these materials, any increase in production costs linked to the addition of fine additives reflects greatly on said ratio, risking to make the end product unmarketable.

In particular, titanium dioxide has a significantly high cost. It may therefore be useful to have composite materials that are free from titanium dioxide, and that despite this have a photocatalytic effect equal to or greater than that provided by titanium dioxide.

Currently the need for photocatalytic composites that meet the aforementioned requirements is largely unfulfilled.

Calcium titanate is a material with properties of refractoriness, chemical resistance and of a semi-conductor. It is found in nature in various forms (e.g. perovskite) characterised by a mixture of phases with different ratios between calcium and titanium, e.g. $CaTiO_3$, $Ca_3Ti_2O_7$, $Ca_4Ti_3O_{10}$, $CaTi_4O_9$, $CaTi_2O_5$, $Ca_2TiO_4$, $CaTi_2O_4(OH)_2$, etc. It can be prepared via dry or wet route. Dry preparation is generally carried out by reacting titanium oxide and calcium carbonate at temperatures greater than 1300° C. (Izv. Akad. Nauk USSR-Neorg. Mater., 11 (1975) 1622). Wet preparation can be carried out in different ways, e.g. hydrothermically by heating an aqueous suspension of titanyl oxalate and a hydrated titanium gel to 150-200° C. in an autoclave (T. R. N. Kutty and R. Vivekanandam, *Mater. Lett.*, 5 (1987) 79-83). It is also known to obtain calcium titanate via peroxide route by treating an aqueous calcium chloride and titanium chloride solution with hydrogen peroxide and ammonia, and subsequently calcining the precipitate obtained. (Pfaff, *J. Eur. Ceram. Soc.*, 9, 1992, 293-299).

Mixtures of cement and titanates have occasionally been described. For example JP2000226248 describes cement mixtures with good flame and acid resistance containing a ceramic powder that includes potassium titanate and titanium dioxide.

SUMMARY

A new photocatalytic composite has now been identified in which the titanium is tightly and stably integrated with a mineral currently used in the field of cement, which is limestone. The composite is obtained by reacting a precursor of titanium dioxide with limestone in basic solution, recovering the product in particular conditions, drying it and calcining the solid obtained. The composite, obtained by operating in presence of sodium, contains limestone and calcium titanate, the latter characterised by two crystalline phases not known until now (herein characterised and referred to as CT2 and CT5). The composite thus obtained, which can be used as such or in mixture with other components, has shown an unexpectedly high photocatalytic activity.

DETAILED DESCRIPTION

The photocatalytic composite object of the invention comprises limestone and calcium titanate; the latter is present in part in the known form of perovskite (traces) and in part in the form of two new crystalline phases, herein identified here and characterised for the first time, referred to as CT2 and CT5.

For the purposes of the present invention by calcium titanate in crystalline phase CT2 it is meant a crystalline chemical compound containing calcium and titanium, present in molar ratio 1:2, having empirical formula $CaTi_2O_5$, identified by the characteristic diffraction peaks: (002) d(interplanar distance)=4.959; (210-202) d=2.890; (013) d=2.762 and (310-122) d=2.138. These peaks are indexed with an orthorhombic cell having the following reticular parameters: a=7.1 Å, b=5.0 Å, c=9.9 Å.

For the purposes of the present invention by calcium titanate in crystalline phase CT5 it is meant a crystalline chemical compound containing calcium and titanium, present in molar ratio 1:5, having empirical formula CaTi5O11, identified by the characteristic diffraction peaks: (002) d=8.845; (023) d=4.217; (110) d=3.611 and (006) d=2.948. These peaks are indexed with an orthorhombic cell having the following reticular parameters: a=3.8 Å, b=12.1 Å, c=17.7 Å.

For the purposes of the present application the crystallographic parameters for phases CT2 and CT5 herein indicated and claimed are meant to be variable within a range of about ±0.5 Å for the parameters of the cell a,b,c, and within a range of about ±0.05 for the interplanar distances d; similarly, the calcium:titanium molar ratios indicated above are meant to be variable by about ±10%.

The microstructural characteristics of phases CT2 and CT5 are widely illustrated in the experimental part.

In the composites object of the invention, the amounts of calcium titanate in CT2 phase and in CT5 phase are widely variable: preferably they are present in similar amounts. In an embodiment of the invention the calcium titanate is present exclusively in CT2 phase or exclusively in CT5 phase.

The aforementioned calcium titanate in the CT2 and/or CT5 phase represents per se constitutes a particular embodiment of the present invention. The limestone used to form the composite is the commercially available one, preferably in finely divided form, also commercially available (example source: cava di Tinella (Fasano, Brindisi))

The BET surface area of the composite generally ranges from 1 to 150 m²/g, with preferred values between 2 and 20 m²/g, e.g. between 5 and 10 m²/g.

The process for obtaining the composites described here constitutes a further aspect of the invention. It generally comprises reacting limestone and a precursor of titanium dioxide in a basic solution containing sodium ions. The reactants can be added into the reactor in indifferent order; preferably the limestone is contacted first with the basic solution and then with the precursor. The precursor used is preferably titanyl sulphate. The basic solution containing sodium ions is preferably an aqueous NaOH solution. In the process conditions the precursor converts totally into calcium titanate. Preferably, an amount of precursor is used corresponding to a theoretical content of $TiO_2$ (i.e. calculated considering a total conversion of the precursor into $TiO_2$) of about 20% by weight with respect to the limestone. The reaction goes on for a time of between 45 and 90 minutes, at a temperature ranging from 20 and 80° C. At the end of the reaction, the resulting solid product is recovered from the solution, optionally washed, then dried and calcined. The washing generally takes place with water; it must in any case be partial, in order not to completely eliminate the sodium residues coming from the basic solution used. Alternatively, the solid can be completely washed (or else a basic solution not containing sodium can be used) and then a sufficient amount of sodium can be introduced, e.g. by dispersing the solid a suitable aqueous solution having an adequate concentration of sodium ions. Indeed, it has been observed that in presence of sodium (at least 0.05% by weight, expressed as $Na_2O$ over the dry product), the precursor of $TiO_2$ used does not convert into $TiO_2$, but it obtains substantially exclusively calcium titanate; the composite is thus substantially free from titanium dioxide. By "substantially free from" it is meant a composite in which the titanium dioxide is absent, or else it is present in amounts not greater than 2% by weight.

The presence of sodium at the end of the washing can be tested through methods known in the field, e.g. via flame test, X-ray fluorescence and atomic absorption, etc. In case it is opted not to wash the reaction solid, the presence of substantial amounts of sodium in the product (deriving from the initial basic solution) is in any case ensured and does not need to be tested analytically.

The calcining preferably takes place at a temperature ranging from 300 and 800° C., e.g. between 450 and 700° C.; particularly effective photocatalytic composites have been obtained by calcining at about 650° C.

Heat treatments below 525° C. are less preferable since they need long times (over 24 hours) for the formation of the desired calcium titanates. The reaction speed at temperatures of between 550 and 650° C. is high. Temperatures of over 700° C. are preferably to be avoided because they cause the start of limestone decarbonatation.

A further object of the present invention is the photocatalytic composite obtained through the process described above.

From the point of view of the elemental composition (as detectable by X-ray fluorescence and atomic absorption), the composites according to the invention can be further characterised as follows:

| | |
|---|---|
| Calcium (expressed as CaO) | 20-50% |
| Titanium (expressed as $TiO_2$) | 15-68% |
| Sulphur (expressed as SO3) | 0-5% |
| Sodium (expressed as Na2O) | ≥0.05% |
| L.o.I. (*) | 9-40% |

(*) loss on ignition

Or more preferably as follows:

| | |
|---|---|
| Calcium (expressed as CaO) | 43.8% |
| Titanium (expressed as $TiO_2$) | 24.3% |
| Sulphur (expressed as SO3) | <0.1% |
| Sodium (expressed as Na2O) | 0.64% |
| L.o.I. (*) | 31.0% |

The elemental composition given in the tables refers to the composite as a whole: such a composite comprises, in addition to calcium titanate, limestone and residues of the reactants used for the titanate-forming reaction. In particular, the analysis confirms the presence of non-negligible amounts of sodium in the composite, responsible for the complete conversion of the $TiO_2$ precursor into calcium titanate. Indeed, it has been observed that composites obtained in a similar way, but carefully washing the reaction solid until substantially all traces of sodium have been eliminated (sodium residue below 0.05% by weight, expressed as $Na_2O$ over the dry product), contained substantial amounts of titanium dioxide in mixture with the calcium titanate: both products derived from the conversion of the $TiO_2$ precursor; the group of composites thus obtained has specific application advantages and is the object of a co-pending application to the Applicant.

As highlighted by the electron microscopy observations contained in the experimental part, the calcium titanate in the present composites is in the form of crystalline grains of a size of about 10-150 microns, closely connected to limestone grains. There is thus clearly a strong aggregative link between the photocatalytic portion of the composite (calcium titanate) and the mineral support component (limestone); within these aggregates, the calcium titanate crystals in phase CT2 are generally rounded, whereas those in phase CT5 generally have a characteristic rod shape.

The present invention represents a successful example of composite material in which the calcium titanate is closely and stably linked to a support material (limestone) able to be used in the cement field. The close interconnection between the photocatalytic and non-photocatalytic parts of the composite obtains a substantial continuity between absorption sites of the pollutants and decomposition sites thereof, with the advantage of high photocatalytic efficiency. Such efficiency has been highlighted by abatement tests of N-oxides ($NO_x$) and VOC (aromatic hydrocarbons), using the composite of the invention either as such, or incorporated in bulk in a cement matrix.

With the present invention a highly integrated multi-phase composite material has been obtained, free from titanium dioxide, having high photocatalytic activity, particularly suitable for being incorporated in cement matrices.

Despite the lack of $TiO_2$, the "absolute" photocatalytic activity of the composite (expressed as amount of NO abated) proved unexpectedly similar to that of equivalent commercial products containing the best known photocatalyst (anatase titanium dioxide, PC-105, Millenium). The "relative photocatalytic activity (expressed as ratio between the amount of NO abated and the total weight of titanium present in the composite) proved to be even greater than that of similar composites containing the same calcium titanate and titanium dioxide: there is thus, for the calcium titanate of the invention and its composites, an intrinsically greater photocatalytic activity than that of titanium dioxide, the latter up to now considered the photocatalyst of choice.

A further object of the invention is the use of the photocatalytic composite described earlier as photocatalytic product as such, or in the preparation of cements and cement articles of manufacture endowed with photocatalytic activity. The article of manufacture can contain the composite dispersed in bulk, or layered on its outer surfaces, as coating: in the latter case the photocatalytic composite is preferably mixed with suitable tackifiers, used to promote suitable cohesion between article of manufacture and coating layer. In any case, the composite is used in amounts such as to obtain a concentration of composite in bulk preferably ranging from 1% to 15%, more preferably between 2% and 10%. The methods for the dispersion in bulk or for the outer coating are per se widely known in the field in question.

An aspect of the invention thus concerns photocatalytic composition, in particular of the cementitious type, comprising the composite described above. The further elements of the cement composition are those commonly known, in particular: various hydraulic binders, optional aggregates and additives used in the cement field. The hydraulic binders and the aggregates (defined for example by standards UNI ENV 197.1 and UNI 8520) are products widely known in the field. The compositions according to the invention can be provided in fluid state, or else mixed with water (to form mortars or concretes, depending upon the granule size of the aggregates used), or else they can be provided in the corresponding forms free from water (dry premixes). These compositions are used to form photocatalytic articles of manufacture through suitable casting in moulds and similar technologies; the resulting articles of manufacture contain the composite of the invention dispersed in bulk. Alternatively, they can be used as coating formulations of pre-existing articles of manufacture, preferably co-formulated with suitable tackifiers.

The invention is illustrated hereafter not for limiting purposes through the following examples.

EXPERIMENTAL PART

Example 1

Preparation of the Composite (STCA02)

280 g of a commercial calcareous filler (origin: cava Tinella di Brindisi) were stirred, suspended in 700 ml of a NaOH solution (200 g/l in distilled water), and an aqueous solution of 700 ml of $TiOSO_4$ (100 g/l di $TiO_2$), so as to have a theoretical $TiO_2$ content equal to about 20% by weight, was dripped. The powder obtained was filtered and partially washed with distilled water, thus keeping a part of the sodium deriving from the NaOH in the solid. The powder was then dried at 105° C. in a ventilated oven. Before performing the calcining heat treatment at 650° C. for 2 hours, the product was broken up so as to obtain a powder.

Example 2

Alternative for the Preparation of the Composite (STCA02)

280 g of a commercial calcareous filler (origin: cava Tinella di Brindisi) were stirred, suspended in a 2M aqueous solution of $NH_4HCO_3$ (slightly in excess with respect to the titanyl sulphate), and an aqueous solution of 700 ml of $TiOSO_4$ (100 g/l of $TiO_2$), so as to have a theoretical content of $TiO_2$ equal to about 20% by weight, was dripped. The powder obtained was filtered and completely washed with distilled water. The powder was then dried at 105° C. in a ventilated oven. The solid product was then again dispersed in an aqueous solution at a known concentration of NaOH (the concentration is such as to introduce the desired amount of Na, expressed as $Na_2O$, over the solid), and kept agitated until the solution is completely dry. Before performing the calcining heat treatment at 650° C. for 2 hours, the product was broken up so as to obtain a powder.

Example 3

Microstructural Characterisation

Figure 1:
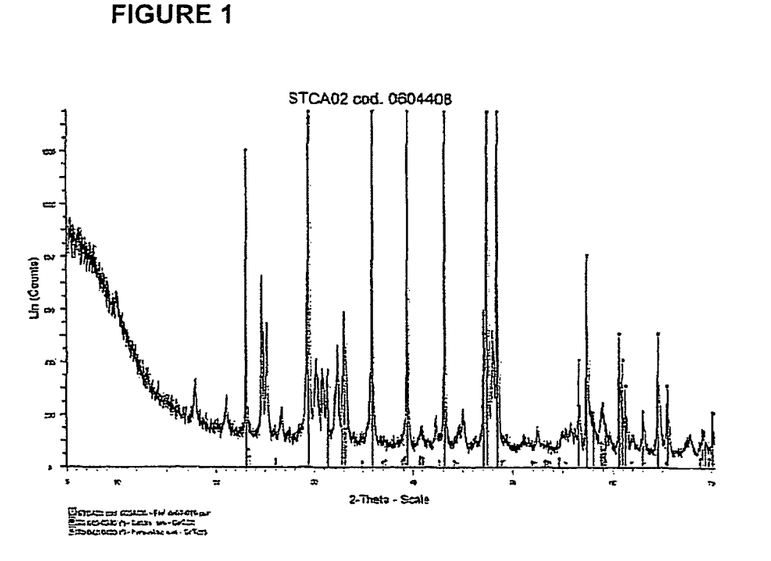
FIG. 1: Diffractogram of the composite STCA 02

The composite STCA 02 obtained in example 1, subjected to diffractometric analysis (diffractometer BRUKER D8 Advance and CuKα ($\lambda_{Cu}$=1.545 Å) radiation, proved to be a polyphase mixture consisting of calcite, traces of perovskite, and calcium titanate in different crystalline phases. In particular, the diffraction profile showed the presence of a series of peaks not attributable to known crystalline phases, which can be referred to two different phases (CT2 and CT5) that proved to be calcium titanate-containing compounds with ratios of Ca:Ti 1:2 and 1:5 respectively (see FIG. 1). The peaks attributable to the two phases are of similar intensity, indicating that they are present in the composite in comparable amounts.

Figure 2:
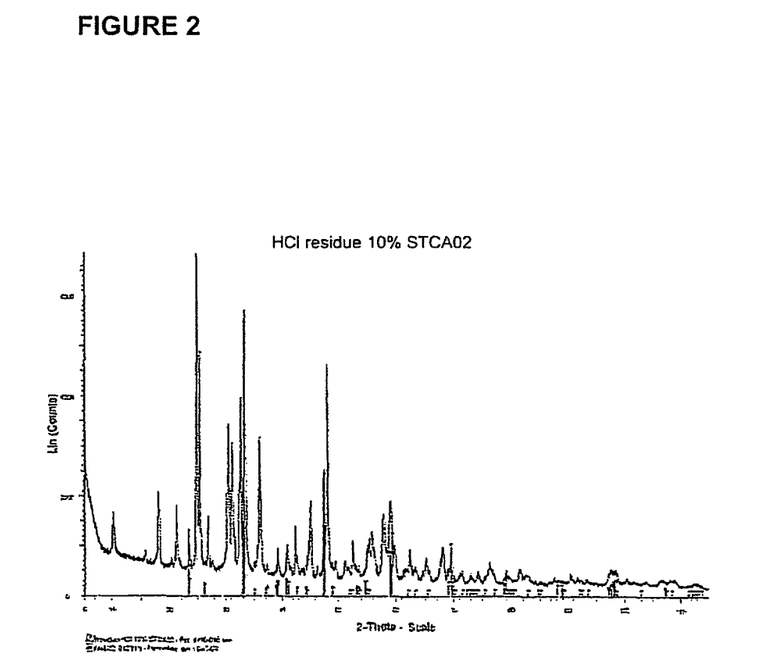
FIG. 2: Diffractogram of the acid residue of the composite STCA02

The accurate position of the peaks of the new crystalline phases was determined through diffractometric analysis of the sample after elimination of the calcite by treatment in diluted HCl (1:10) and subsequent drying at 60° C. (FIG. 2).

The observed interplanar distances (d) of the two phases are shown in the following tables, wherein h,k,l indicate the Miller indices, and °2θ indicate the diffraction angle.

interplanar distances for $CaTi_2O_5$; Space group: $Pna2_1$ a=7.1 Å, b=5.0 Å, c=9.9 Å

| h | k | l | d | °2θ |
|---|---|---|---|---|
| 0 | 0 | 2 | 4.96 | 17.87 |
| 0 | 1 | 1 | 4.48 | 19.80 |
| 1 | 1 | 0 | 4.10 | 21.66 |
| 1 | 1 | 1 | 3.79 | 23.46 |
| 2 | 0 | 0* | 3.55 | 25.08 |
| 2 | 0 | 1 | 3.34 | 26.67 |
| 1 | 1 | 2 | 3.16 | 28.22 |
| 2 | 1 | 0 | 2.90 | 30.84 |
| 2 | 0 | 2 | 2.89 | 30.97 |
| 2 | 1 | 1 | 2.78 | 32.16 |
| 0 | 1 | 3 | 2.76 | 32.39 |
| 1 | 1 | 3 | 2.57 | 34.83 |
| 0 | 2 | 0 | 2.51 | 35.72 |
| 2 | 1 | 2 | 2.50 | 35.86 |
| 0 | 0 | 4 | 2.48 | 36.19 |
| 2 | 0 | 3 | 2.42 | 37.14 |
| 1 | 2 | 0 | 2.37 | 37.98 |
| 1 | 2 | 1 | 2.30 | 39.09 |
| 0 | 2 | 2 | 2.24 | 40.22 |
| 2 | 1 | 3 | 2.18 | 41.40 |
| 3 | 1 | 0 | 2.14 | 42.20 |
| 1 | 2 | 2 | 2.14 | 42.27 |
| 1 | 1 | 4 | 2.12 | 42.57 |
| 3 | 1 | 1 | 2.09 | 43.22 |
| 2 | 2 | 0 | 2.05 | 44.15 |
| 2 | 0 | 4 | 2.03 | 44.54 |
| 2 | 2 | 1 | 2.01 | 45.13 |
| 3 | 1 | 2 | 1.96 | 46.17 |
| 1 | 2 | 3 | 1.92 | 47.18 |
| 2 | 2 | 2* | 1.89 | 47.99 |
| 2 | 1 | 4 | 1.88 | 48.27 |
| 0 | 1 | 5 | 1.85 | 49.35 |
| 3 | 1 | 3 | 1.80 | 50.79 |
| 1 | 1 | 5 | 1.79 | 51.11 |
| 4 | 0 | 0 | 1.77 | 51.48 |
| 0 | 2 | 4 | 1.76 | 51.77 |
| 4 | 0 | 1 | 1.75 | 52.36 |
| 2 | 2 | 3 | 1.74 | 52.48 |
| 2 | 0 | 5 | 1.73 | 52.83 |
| 3 | 2 | 0 | 1.72 | 53.16 |
| 1 | 2 | 4 | 1.71 | 53.47 |
| 3 | 2 | 1 | 1.70 | 54.02 |
| 4 | 1 | 0 | 1.67 | 54.85 |
| 4 | 0 | 2 | 1.67 | 54.94 |
| 0 | 0 | 6 | 1.65 | 55.54 |
| 0 | 3 | 1 | 1.65 | 55.63 |
| 4 | 1 | 1 | 1.65 | 55.69 |
| 2 | 1 | 5 | 1.64 | 56.14 |
| 1 | 3 | 0 | 1.63 | 56.42 |
| 3 | 2 | 2 | 1.63 | 56.54 |
| 3 | 1 | 4 | 1.62 | 56.78 |
| 1 | 3 | 1 | 1.61 | 57.25 |
| 4 | 1 | 2 | 1.58 | 58.17 |
| 2 | 2 | 4 | 1.58 | 58.36 |
| 4 | 0 | 3 | 1.56 | 59.06 |
| 1 | 3 | 2 | 1.55 | 59.68 |
| 1 | 1 | 6 | 1.53 | 60.32 |
| 3 | 2 | 3 | 1.53 | 60.59 |
| 1 | 2 | 5 | 1.52 | 60.87 |
| 2 | 3 | 0 | 1.51 | 61.16 |
| 2 | 0 | 6 | 1.50 | 61.87 |
| 2 | 3 | 1 | 1.50 | 61.95 |
| 0 | 3 | 3 | 1.49 | 62.09 |
| 4 | 1 | 3 | 1.49 | 62.15 |
| 1 | 3 | 3 | 1.46 | 63.61 |
| 3 | 1 | 5 | 1.45 | 63.94 |
| 4 | 2 | 0 | 1.45 | 64.24 |
| 2 | 3 | 2 | 1.45 | 64.27 |
| 4 | 0 | 4 | 1.44 | 64.55 |
| 2 | 1 | 6 | 1.44 | 64.88 |
| 4 | 2 | 1 | 1.43 | 65.01 |
| 2 | 2 | 5 | 1.43 | 65.42 |
| 3 | 2 | 4 | 1.41 | 66.00 |
| 4 | 2 | 2 | 1.39 | 67.27 |
| 4 | 1 | 4 | 1.39 | 67.50 |
| 0 | 2 | 6 | 1.38 | 67.81 |
| 2 | 3 | 3 | 1.38 | 68.05 |
| 3 | 3 | 0 | 1.37 | 68.63 |
| 5 | 1 | 0 | 1.37 | 68.69 |
| 0 | 1 | 7 | 1.36 | 68.78 |
| 1 | 3 | 4 | 1.36 | 68.89 |
| 1 | 2 | 6 | 1.36 | 69.26 |
| 3 | 3 | 1 | 1.35 | 69.37 |
| 5 | 1 | 1 | 1.35 | 69.43 |
| 1 | 1 | 7 | 1.34 | 70.22 |
| 4 | 2 | 3 | 1.33 | 70.97 |
| 4 | 0 | 5 | 1.32 | 71.26 |
| 3 | 3 | 2 | 1.32 | 71.57 |
| 5 | 1 | 2 | 1.32 | 71.62 |
| 2 | 0 | 7 | 1.32 | 71.65 |

*peaks on top of the main peaks of the anatase.

d interplanar distances for $CaTi_5O_{11}$; Space group Cmcm a=3.8 Å, b=12.1 Å, c=17.7 Å

| h | k | l | d | °2θ | h | k | l | D | th2§ | h | k | l | d | °2θ | h | k | l | d | °2θ |
|---|---|---|---|---|---|---|---|---|---|---|---|---|---|---|---|---|---|---|---|
| 0 | 0 | 2 | 8.85 | 9.99 | 1 | 3 | 5 | 2.18 | 41.47 | 1 | 1 | 9 | 1.73 | 52.96 | 0 | 8 | 2 | 1.49 | 62.38 |
| 0 | 2 | 0 | 6.04 | 14.66 | 0 | 4 | 6 | 2.11 | 42.83 | 1 | 3 | 8 | 1.73 | 53.02 | 1 | 7 | 4 | 1.48 | 62.77 |
| 0 | 2 | 1 | 5.71 | 15.50 | 0 | 2 | 8 | 2.08 | 43.53 | 0 | 2 | 10 | 1.70 | 53.94 | 0 | 0 | 12 | 1.48 | 62.96 |
| 0 | 2 | 2 | 4.99 | 17.77 | 1 | 1 | 7 | 2.07 | 43.65 | 1 | 5 | 6 | 1.68 | 54.74 | 2 | 2 | 7 | 1.47 | 63.20 |
| 0 | 0 | 4 | 4.43 | 20.05 | 1 | 5 | 0 | 2.04 | 44.47 | 2 | 2 | 4 | 1.67 | 54.84 | 1 | 1 | 11 | 1.47 | 63.20 |
| 0 | 2 | 3 | 4.22 | 21.04 | 1 | 5 | 1 | 2.02 | 44.78 | 0 | 6 | 6 | 1.66 | 55.22 | 0 | 8 | 3 | 1.46 | 63.60 |
| 1 | 1 | 0 | 3.61 | 24.62 | 1 | 3 | 6 | 2.01 | 44.96 | 0 | 4 | 9 | 1.65 | 55.74 | 2 | 4 | 5 | 1.46 | 63.64 |
| 0 | 2 | 4 | 3.57 | 24.93 | 0 | 6 | 0 | 2.01 | 45.02 | 2 | 2 | 5 | 1.61 | 57.20 | 2 | 0 | 8 | 1.44 | 64.75 |
| 1 | 1 | 1 | 3.54 | 25.13 | 0 | 6 | 1 | 2.00 | 45.33 | 2 | 4 | 0 | 1.60 | 57.41 | 1 | 7 | 5 | 1.43 | 64.94 |
| 1 | 1 | 2 | 3.35 | 26.63 | 1 | 5 | 2 | 1.98 | 45.69 | 1 | 3 | 9 | 1.60 | 57.51 | 0 | 2 | 12 | 1.43 | 65.04 |
| 1 | 1 | 3 | 3.08 | 28.95 | 0 | 6 | 2 | 1.96 | 46.24 | 2 | 4 | 1 | 1.60 | 57.66 | 0 | 8 | 4 | 1.43 | 65.28 |
| 0 | 2 | 5 | 3.05 | 29.22 | 0 | 4 | 7 | 1.94 | 46.83 | 2 | 0 | 6 | 1.59 | 57.82 | 0 | 4 | 11 | 1.42 | 65.71 |
| 0 | 4 | 0 | 3.02 | 29.58 | 1 | 5 | 3 | 1.92 | 47.19 | 1 | 1 | 10 | 1.59 | 57.97 | 1 | 5 | 9 | 1.41 | 65.99 |

-continued

| h | k | l | d | °2θ | h | k | l | D | th2§ | h | k | l | d | °2θ | h | k | l | d | °2θ |
|---|---|---|---|---|---|---|---|---|---|---|---|---|---|---|---|---|---|---|---|
| 0 | 4 | 1 | 2.97 | 30.01 | 0 | 6 | 3 | 1.90 | 47.72 | 1 | 5 | 7 | 1.59 | 58.13 | 2 | 4 | 6 | 1.41 | 66.28 |
| 0 | 0 | 6 | 2.95 | 30.27 | 2 | 0 | 0 | 1.89 | 48.01 | 2 | 4 | 2 | 1.58 | 58.43 | 0 | 6 | 9 | 1.41 | 66.42 |
| 0 | 4 | 2 | 2.86 | 31.29 | 1 | 1 | 8 | 1.89 | 48.19 | 0 | 6 | 7 | 1.57 | 58.59 | 2 | 2 | 8 | 1.40 | 66.80 |
| 1 | 1 | 4 | 2.80 | 31.95 | 0 | 2 | 9 | 1.87 | 48.65 | 1 | 7 | 0 | 1.57 | 58.79 | 1 | 3 | 11 | 1.39 | 67.31 |
| 1 | 3 | 0 | 2.76 | 32.44 | 1 | 3 | 7 | 1.86 | 48.82 | 1 | 7 | 1 | 1.56 | 59.04 | 0 | 8 | 5 | 1.39 | 67.41 |
| 1 | 3 | 1 | 2.72 | 32.84 | 2 | 0 | 2 | 1.85 | 49.17 | 0 | 2 | 11 | 1.55 | 59.39 | 1 | 7 | 6 | 1.39 | 67.55 |
| 0 | 4 | 3 | 2.69 | 33.32 | 1 | 5 | 4 | 1.85 | 49.23 | 2 | 4 | 3 | 1.55 | 59.70 | 2 | 6 | 0 | 1.38 | 67.93 |
| 0 | 2 | 6 | 2.65 | 33.79 | 0 | 6 | 4 | 1.83 | 49.74 | 1 | 7 | 2 | 1.55 | 59.80 | 2 | 6 | 1 | 1.37 | 68.16 |
| 1 | 3 | 2 | 2.63 | 34.02 | 2 | 2 | 0 | 1.81 | 50.48 | 2 | 2 | 6 | 1.54 | 60.00 | 1 | 1 | 12 | 1.37 | 68.67 |
| 1 | 1 | 5 | 2.53 | 35.47 | 2 | 2 | 1 | 1.80 | 50.76 | 0 | 4 | 10 | 1.53 | 60.60 | 2 | 6 | 2 | 1.36 | 68.86 |
| 1 | 3 | 3 | 2.50 | 35.92 | 0 | 4 | 8 | 1.78 | 51.15 | 1 | 7 | 3 | 1.52 | 61.05 | 2 | 4 | 7 | 1.35 | 69.32 |
| 0 | 4 | 4 | 2.49 | 35.99 | 2 | 2 | 2 | 1.77 | 51.59 | 0 | 8 | 0 | 1.51 | 61.39 | 0 | 8 | 6 | 1.34 | 69.98 |
| 1 | 3 | 4 | 2.34 | 38.43 | 0 | 0 | 10 | 1.77 | 51.59 | 2 | 4 | 4 | 1.51 | 61.44 | 2 | 6 | 3 | 1.34 | 70.02 |
| 0 | 2 | 7 | 2.33 | 38.57 | 1 | 5 | 5 | 1.76 | 51.76 | 0 | 8 | 1 | 1.50 | 61.64 | 1 | 5 | 10 | 1.34 | 70.43 |
| 0 | 4 | 5 | 2.30 | 39.19 | 0 | 6 | 5 | 1.75 | 52.26 | 1 | 5 | 8 | 1.50 | 61.88 | 1 | 7 | 7 | 1.33 | 70.57 |
| 1 | 1 | 6 | 2.29 | 39.40 | 2 | 0 | 4 | 1.74 | 52.53 | 1 | 3 | 10 | 1.49 | 62.28 | 2 | 2 | 9 | 1.33 | 70.75 |
| 0 | 0 | 8 | 2.21 | 40.75 | 2 | 2 | 3 | 1.73 | 52.96 | 0 | 6 | 8 | 1.49 | 62.33 | 0 | 6 | 10 | 1.33 | 70.85 |

Example 4

Microscope Analysis

Figure 3:
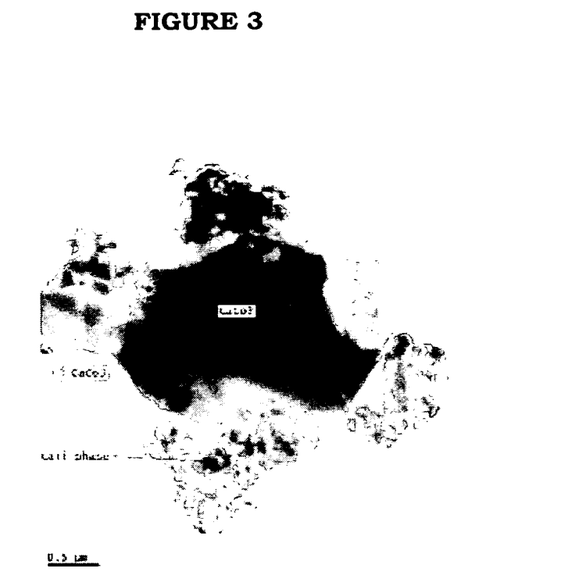
FIG. 3,4: Images in bright field TEM of a calcite crystal and of the micro-nanocrystalline aggregates (scale 0.5 μm)
Figure 4:
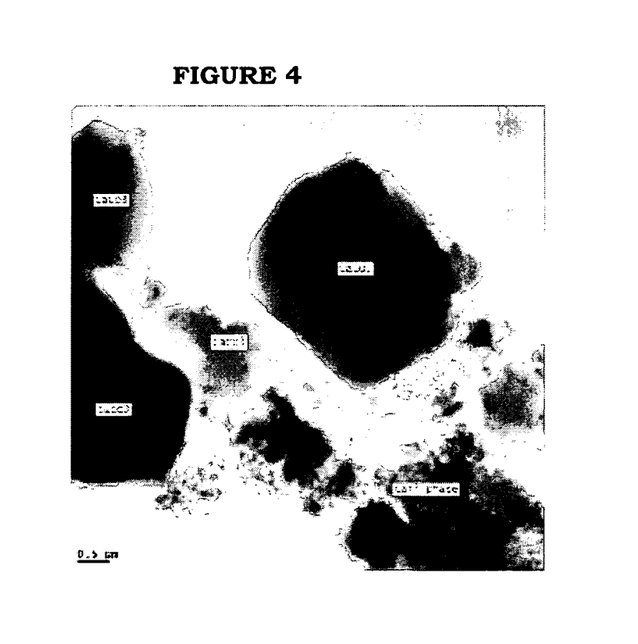

In order to better understand the nature of the sample, both the sample as such and the acid residue were subjected to analysis by transmission electron microscopy (TEM). The observations allowed to establish that the sample consisted of a mixture of crystals of a few microns of calcium carbonate and of crystalline micro-nano aggregates (grains) of calcium titanate and carbonate having variable size from 50 to 300 nm (see FIGS. 3 and 4).

Figure 5:
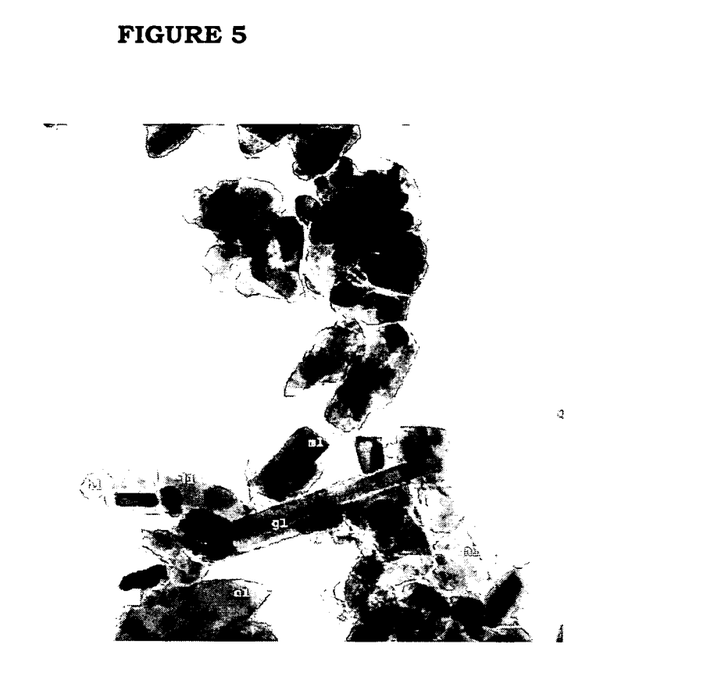
FIG. 5: Image in bright field TEM of the crystals of the phases CT2 (h1, o1, l1, m1) and CT5 (g1 and n1) (scale 100 nm)
Figure 6:
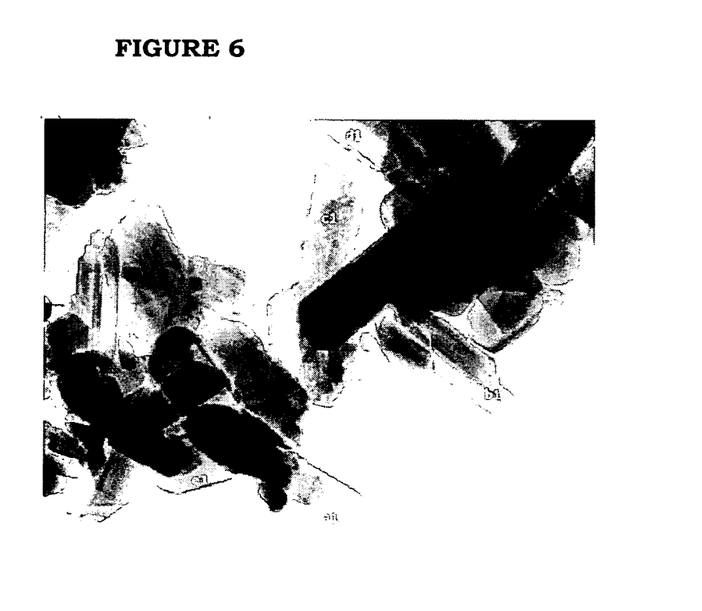
FIG. 6: Image in bright field TEM of the crystals of phases CT2 (e1) and CT5 (a1, b1, c1, d1) (scale 50 nm)

Through microanalysis with EDS detector it has been possible to identify two families of crystals containing both Ca and Ti, one with a characteristic rounded shape, the other with an elongated shape (FIG. 5, 6). The semiquantitative analyses made by focussing the electron beam on different crystals of the first phase have allowed to establish that the Ca:Ti ratio in this phase, here referred to as CT2, is about 1:2

High-resolution images were carried out on some crystals of this phase with the corresponding Fourier transforms, from which it has been possible to extract information on the cell parameters for the CT2 phase:
Orthorhombic: a=7.1 Å, b=5.0 Å, c=9.9 Å.

The extinction conditions observed are the following:

$0kl\ k+l=2n$ $hhl$ no cond (1)

$2hhl$ no cond $h00\ h=2n$ $0k0\ k=2n$ (2)

By adding the extinctions (1) and (2) one obtains as possible space group Pna21 (Herman Mauguin Symbol), corresponding to the space group 33 shown in International Tables of Crystallography, vol. A, "Space Groups Symmetry", V ed., Kluver Acad. Publ. 2002)

Possible monoclinic distortions can exist and the TEM data obtained cannot exclude them.

The software used for simultaneously indexing such patterns was QED (Belletti D., Calestani G., Gemmi M, Migliori A.—QED V 1.0: a software package for quantitative electron diffraction data treatment—Ultramicroscopy, 81 (2000) pp 57-65).

In light of the information obtained on the cell of this new phase it was possible to assign some of the peaks not identified in the diffractogram of the sample STCA06 to the CT2 phase.

The remaining peaks are attributable to a different phase (CT5, see later).

The cell parameters of the CT2 phase have been further refined through fitting of the calculated diffractometric profile with the real one.

Through microanalyses with EDS detector it has been confirmed that the family of rounded crystals is conform with CT2 phase, found in the sample of photocatalytic composite.

Other crystals of characteristic elongated form were found to contain Ca, Ti and small amounts of Na. This new crystalline phase, characterised by a Ca:Ti ratio of about 1:5, is referred to here as CT5. Similarly to what was done for CT2, some high-resolution images were taken, with the corresponding Fourier transforms from which it has been possible to extract information on the cell parameters.

The main characteristic of this phase is a periodicity of 17.6 Å.

From the simultaneous indexing of such patterns via QED software (Belletti et al., op.cit.) it has been possible to derive a possible cell for the compound in question. The cell was orthorhombic C centred:
a=3.8 (10) Å, b=12.1 (20) Å, c=17.7 (2) Å (decimal error)

Possible monoclinic distortions can exist and the TEM data obtained cannot exclude them.

The extinction conditions observed are:

$hkl\ h+k=2n$ $hk0\ h+k=2n$ $0kl$ not able to be determined $h0l\ h,l=2n$ $h00\ h=2n$ $0k0\ k=2n$ $001\ 1=2n$ These extinctions are compatible with the following possible space groups:
type C-c-: Cmc21, C2cm, Cmcm (corresponding to the space group 63, cf. International Tables of Crystallography, vol. A, "Space Groups Symmetry", V ed., Kluver Acad. Publ. 2002) in the case of extinction 0kl k=2n;

type Ccc-:Ccc2, Cccm in the case of extinction 0kl k,l=2n.

The cell parameters of the CT5 phase have been further refined through fitting of the calculated diffractometric profile with the real one.

Example 5

Analysis of Specific BET Surface and Microporosity

The values measured during the analysis of the new photocatalytic composite STCA 02 shown in the table show an increase in the specific surface of the heat treated product (650° C.), with respect to the limestone as such, with an increase in the non-microporous fraction.

|  | BET $m^2/g$ | Micropore Volume $mm^2/g$ | S.S.A Micropores $m^2/g$ | S.S.A non-micropores $m^2/g$ |
|---|---|---|---|---|
| STCA 02 | 5.11 | 0.59 | 1.65 | 3.46 |
| CA - limestone | 0.84 | 0.01 | 0.03 | 0.81 |

By working at different temperatures it is also observed that the surface area generally tends to decrease as the calcining temperature increases.

Example 6

Photocatalytic Activity on Cement $NO_x$ Abatement Measurements

Figure 7:
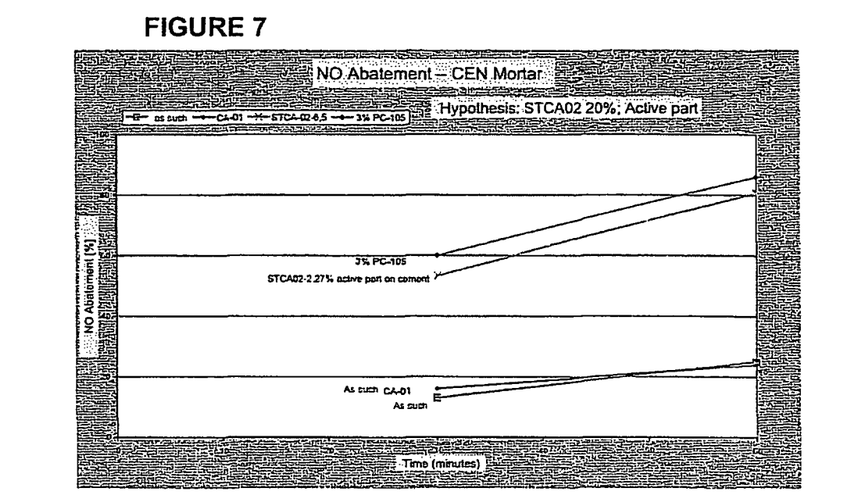
FIG. 7: Abatement of NO on CEN mortar according to the type of photocatalyst. As such: CEN mortar with only Italbianco cement. As such CA-01: CEN mortar with Italbianco cement and limestone.

The composite STCA02 was mixed with white cement (Italbianco 52.5 di Rezzato) so as to obtain photocatalytic cements with percentage by weight of photocatalyst within the range 2.0-8.5%. $NO_x$ abatement analyses were carried out on cement mortars made with normalised sand CEN (according to UNI 196-1) by preparing tests in Petri dishes of diameter 8 cm and surface of about 60 $cm^2$. The results obtained show an excellent behaviour of such cements, comparable to that of cement containing commercial anatase (FIG. 7).

The abatement values measured on the mortars CEN containing the composite STCA02 at different concentrations on cement have shown very good $NO_x$ abatement values already at percentages of around 2.5% by weight. (See FIG. 7)

The photocatalytic activity tends to increase as the calcining temperature of the sample increases.

Example 7

Photocatalytic Activity on Cement

VOC Abatement Measurements

Figure 8:
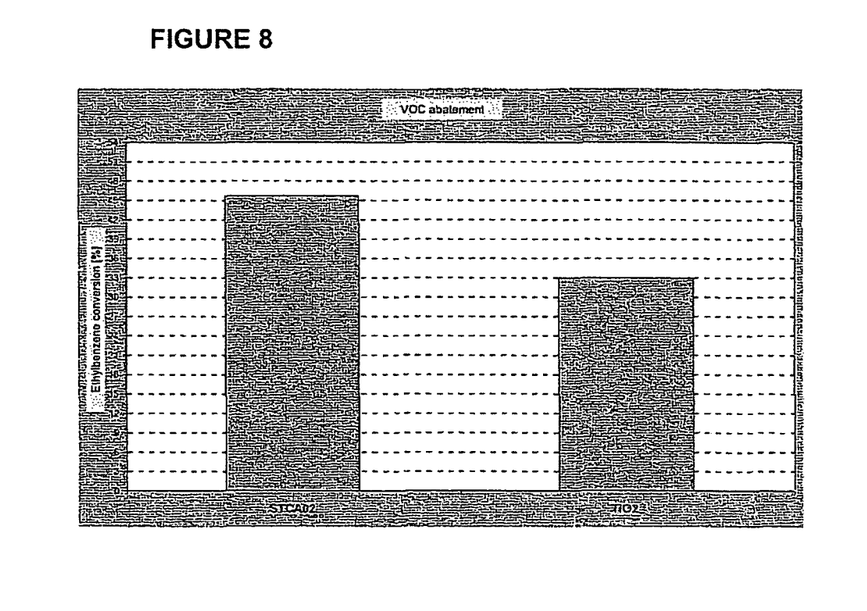
FIG. 8: Abatement of $NO_x$ on CEN mortar by the composite STCA02 with respect to the cement.

The evaluation of the abatement capability of aromatic hydrocarbons was carried out using the pure photocatalytic products (not mixed with cement) under UV radiation. Ethylbenzene was used as organic substance, using a flow apparatus typical of tests on catalysts (oxidation of ethylbenzene in air). In this way the intrinsic activity of the material is determined, disregarding the diffusive phenomena. The results obtained show an excellent level of abatement activity of the product. It is greater than the best commercial $TiO_2$ (FIG. 8).

The invention claimed is:

1. Photocatalytic composite substantially free from titanium dioxide, comprising limestone, and calcium titanate in the crystalline phases CT2 and/or CT5 characterized by the following diffraction peaks:
   CT2: (002) d=4.959; (210-202) d=2.890; (013) d=2.762 and (310-122) d=2.138;
   CT5: (002) d=8.845; (023) d=4.217; (110) d=3.611 and (006) d=2.948,
   wherein the calcium titanate in CT2 phase has empirical formula $CaTi_2O_5$ and the calcium titanate in CTS phase has empirical formula $CaTi_5O_{11}$.

2. Composite according to claim 1, wherein said peaks of the CT2 phase are indexed with an orthorhombic cell having the following reticular parameters: a=7.1 Å, b=5.0 Å, c=9.9 Å.

3. Composite according to claim 1, wherein said peaks of the CT5 phase are indexed with an orthorhombic cell having the following reticular parameters: a=3.8 Å, b=12.1 Å, c=17.7 Å.

4. Composite according to claim 1, wherein the CT2 phase is present in amount equal or similar to the CT5 phase.

5. Composite according to claim 1, having specific BET surface ranging from 1 to 150 $m^2/g$.

6. Composite according to claim 5, having specific BET surface ranging from 2 to 20 $m^2/g$.

7. Composite according to claim 6, having specific BET surface ranging from 5 to 10 $m^2/g$.

8. Calcium titanate with photocatalytic activity, characterised by the presence of the crystalline phases CT2 and/or CT5, as described in claim 1.

9. Process to obtain the composite described in claim 1, comprising reacting limestone and a precursor of titanium dioxide in presence of a basic solution, recovering the solid product thus obtained, optionally washing it, then drying and calcining it, wherein:
   (a) said basic solution contains sodium ions, and said washing is performed in a way not totally eliminating the sodium present;
   (a') or said basic solution contains sodium ions, said washing totally eliminates the sodium present, and the product to be calcined is supplemented with a sodium-containing compound; and
   (a'') or said basic solution does not contain sodium ions, and said optionally washed, dried solid product is added with a sodium containing compound, and then calcined.

10. Process according to claim 9, wherein the product to be calcined contains a residual amount of sodium of at least 0.05% by weight.

11. Process according to claim 9, wherein the precursor is titanyl sulphate, the basic solution contains NaOH, and the solid product is calcined at a temperature ranging from 300 to 800° C.

12. Process according to claim 11, wherein the solid product is calcined at a temperature ranging from 450 to 700° C.

13. Cement composition comprising the photocatalytic composite described in claim 1, water, a hydraulic binder, and optionally aggregates.

14. Dry premix comprising the photocatalytic composite described in claim 1, a hydraulic binder, and optionally aggregates.

15. Photocatalytic article of manufacture comprising, dispersed in bulk or layered on its surface, the composite described in claim 1.

* * * * *